(12) United States Patent
Palukuru et al.

(10) Patent No.: US 11,010,489 B2
(45) Date of Patent: May 18, 2021

(54) PRIVACY PROTECTION SYSTEM FOR VEHICLE COMMUNICATION

(71) Applicant: FORD GLOBAL TECHNOLOGIES, LLC, Dearborn, MI (US)

(72) Inventors: Sai Srikar Palukuru, Dearborn, MI (US); John Moore, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 414 days.

(21) Appl. No.: 15/928,941

(22) Filed: Mar. 22, 2018

(65) Prior Publication Data
US 2019/0294815 A1  Sep. 26, 2019

(51) Int. Cl.
| | |
|---|---|
| *G06F 21/62* | (2013.01) |
| *H04W 4/46* | (2018.01) |
| *H04L 29/06* | (2006.01) |
| *G06F 1/28* | (2006.01) |
| *H04L 9/08* | (2006.01) |
| *G06F 21/60* | (2013.01) |
| *H04W 4/80* | (2018.01) |

(52) U.S. Cl.
CPC .......... *G06F 21/6245* (2013.01); *G06F 1/28* (2013.01); *G06F 21/602* (2013.01); *H04L 9/0861* (2013.01); *H04L 63/0428* (2013.01); *H04W 4/46* (2018.02); *H04W 4/80* (2018.02)

(58) Field of Classification Search
CPC .... G06F 21/6245; G06F 21/602; G06F 21/62; G06F 21/64; G06F 21/33; G06F 1/28; G06F 1/3278; H04L 9/0861; H04L 9/16; H04L 9/3247; H04L 63/0428; H04L 2209/84; H04W 4/46; H04W 4/80; H04W 12/02; H04W 12/1008
See application file for complete search history.

(56) References Cited

U.S. PATENT DOCUMENTS

| | | | |
|---|---|---|---|
| 9,559,804 B2 | 1/2017 | Ibrahim et al. | |
| 10,231,187 B1* | 3/2019 | Rubin | H04W 52/04 |
| 2011/0009151 A1* | 1/2011 | Miucic | H04L 1/0006 |
| | | | 455/522 |
| 2016/0050564 A1* | 2/2016 | Niewczas | H04W 12/06 |
| | | | 455/411 |
| 2017/0243485 A1 | 8/2017 | Rubin et al. | |

OTHER PUBLICATIONS

Junqing Zhang et al. "Key Generation from Wireless Channels: A review" IEEE Access, vol. 4, pp. 616-626 (Year: 2016).*
Onur Gungor et al. "Secret Key Generation Via Localization and Mobility" IEEE Transactions on Vehicular Technology, vol. 64, No. 6, pp. 2214-2230 (Year: 2015).*
Kloiber et al., "Random Transmit Power Control for DSRC and its Application to Cooperative Safety", IEEE Transactions on Dependable and Secure Computing, Jun. 25, 2015, 14 pages, vol. 13, Issue 1, IEEE.

* cited by examiner

*Primary Examiner* — Joseph P Hirl
*Assistant Examiner* — Thomas A Gyorfi
(74) *Attorney, Agent, or Firm* — Michael Spenner; Brooks Kushman PC (57) ABSTRACT

A vehicle-to-vehicle communication system includes a controller programmed to digitally sign each of a plurality of basic safety messages (BSMs) using a private key and broadcast each of the BSMs via the transceiver at respective transmit power levels according to a predetermined power level sequence that is defined by one or more values generated from the private key.

15 Claims, 3 Drawing Sheets

PRIVACY PROTECTION SYSTEM FOR VEHICLE COMMUNICATION

TECHNICAL FIELD

This application generally relates to a system for protecting privacy in a vehicle-to-vehicle communication system.

BACKGROUND

Vehicles have operated in the absence of vehicle-to-vehicle communications for many years. However, with the push toward fully autonomous vehicles there are some benefits to incorporating vehicle-to-vehicle communications. Such communication systems can provide improved situational awareness of the operation of nearby vehicles. In addition, the vehicle-to-vehicle communication can also provide information on nearby traffic management and road infrastructure. To fully utilize vehicle-to-vehicle communication systems, the vehicles must transmit a variety of information at periodic intervals. Such information is available to all receivers which may or may not use the information for the desired purpose. To ensure widespread adoption of the technology, such vehicle-to-vehicle communication systems must address privacy concerns to prevent unauthorized uses of the information.

SUMMARY

A vehicle includes a transceiver for vehicle-to-vehicle communication and a controller programmed to, digitally sign each of a plurality of basic safety messages (BSMs) using a private key and broadcast each of the BSMs via the transceiver at respective transmit power levels according to a predetermined power level sequence that is defined by one or more values generated from the private key.

The controller may be further programmed to change the predetermined power level sequence in response to changes in the one or more values. The predetermined power level sequence may define the respective transmit power level for each of the BSMs such that a magnitude of a difference in transmit power levels between consecutive broadcasts is at least a predetermined magnitude. The predetermined power level sequence may define a change in transmit power level from a previous transmit power level. A magnitude of the change may be at least a predetermined minimum change for each broadcast. The controller may be further programmed to generate a starting transmit power level based on the one or more values generated from the private key. The respective transmit power levels may be within a predetermined range. The predetermined power level sequence may define transmit power levels such that a receiver attached at a fixed location on the vehicle cannot associate a certificate within the basic safety messages with the vehicle based on a receive signal strength being greater than those received from messages not sent by the vehicle.

A vehicle system includes a transceiver and a controller programmed to broadcast, via the transceiver, each of a plurality of basic safety messages that are digitally signed using a private key at respective transmit power levels that are defined by a predetermined power level sequence that is defined by one or more values derived from the private key and that defines transmit power levels for consecutive broadcasts to differ by at least a predetermined magnitude.

The controller may be further programmed to define the predetermined power level sequence as one of a plurality of predefined sequences selected according to a first function of the one or more values. The controller may be further programmed to select a starting power level value from the predetermined power level sequence according to a second function of the one or more values. The controller may be further programmed to select a starting power level value from the predetermined power level sequence according to a function of the one or more values. The predetermined power level sequence may define a change in transmit power level from a previous transmit power level. The controller may be further programmed to generate an initial transmit power level as a function of the one or more values. The predetermined power level sequence may define transmit power levels such that a receiver attached at a fixed location on a vehicle associated with the vehicle system cannot associate a certificate within the basic safety messages with the vehicle based on a receive signal strength being greater than those received from messages not sent by the vehicle.

A method includes broadcasting, by a vehicle controller, each of a plurality of basic safety messages (BSMs) at respective transmit power levels according to a predetermined power level sequence that is defined by one or more values derived from a private key used for digitally signing the BSMs.

The method may further include changing, by the vehicle controller, the predetermined power level sequence in response to changes in the one or more values. The method may further include defining, by the vehicle controller, the predetermined power level sequence by selecting one of a plurality of predetermined transmit power sequences according to a first function of the one or more values. The method may further include defining, by the vehicle controller, the predetermined power level sequence by selecting a starting power level from the one of the plurality of predetermined transmit power sequences according to a second function of the one or more values. The predetermined power level sequence may define the respective transmit power levels such that a magnitude of a difference in transmit power levels between consecutive broadcasts is at least a predetermined magnitude.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
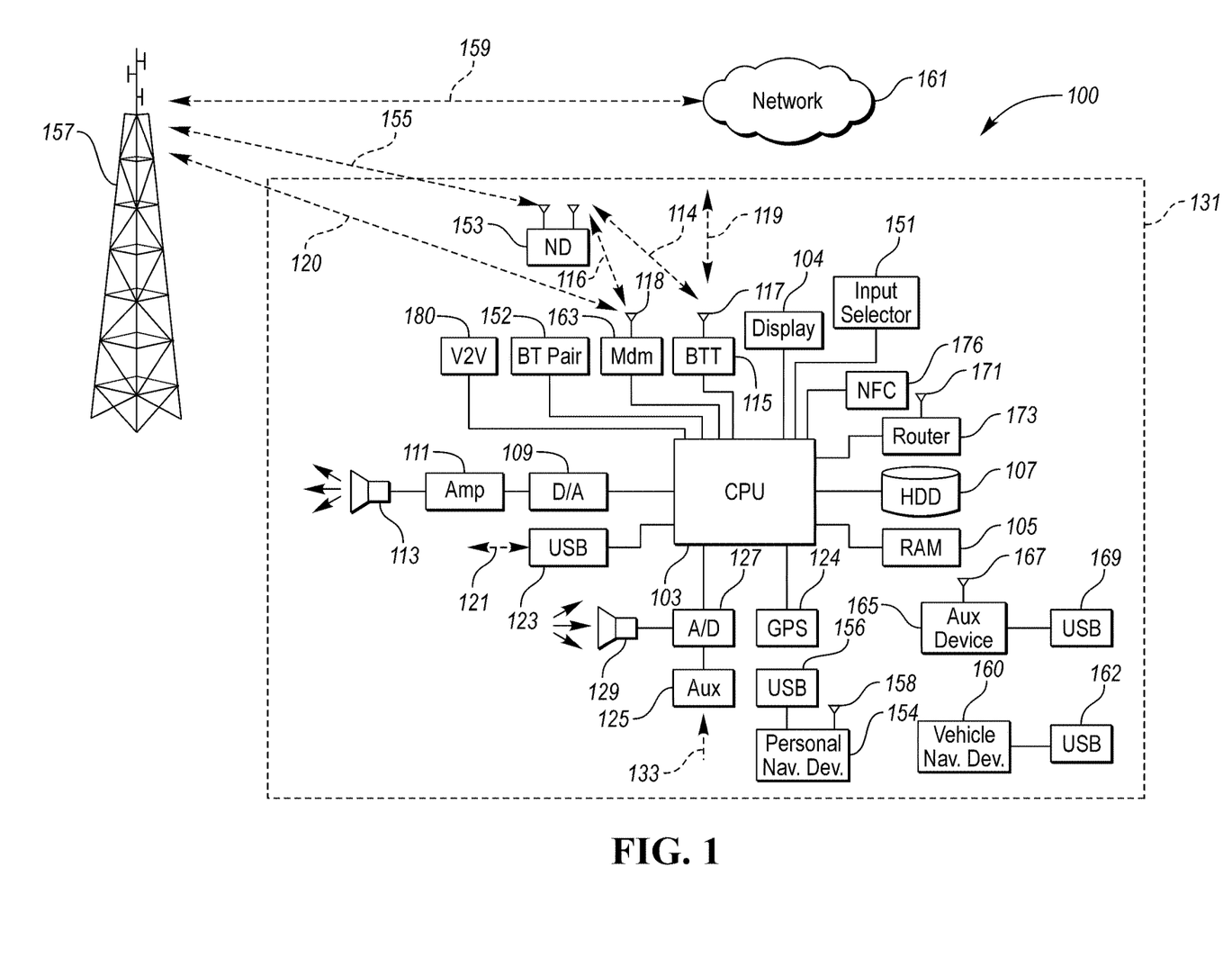
FIG. 1 is a possible configuration of a vehicle communication system.

FIG. 1 illustrates an example block topology for a vehicle-based computing system 100 (VCS) for a vehicle 131. An example of such a vehicle-based computing system 100 is the SYNC system manufactured by THE FORD MOTOR COMPANY. The vehicle 131 enabled with the vehicle-based computing system 100 may contain a visual front-end interface 104 located in the vehicle 131. The user may be able to interact with the interface 104 if it is provided, for example, with a touch sensitive screen. In another illustrative embodiment, the interaction occurs through, button presses, spoken dialog system with automatic speech recognition and speech synthesis.

In the illustrative embodiment shown in FIG. 1, at least one vehicle processor 103 controls at least some portion of the operation of the vehicle-based computing system 100. Provided within the vehicle 131, the processor 103 allows onboard processing of commands and routines. Further, the vehicle processor is connected to both non-persistent storage 105 and persistent storage 107. In this illustrative embodiment, the non-persistent storage 105 is random access memory (RAM) and the persistent storage 107 is a hard disk drive (HDD) or flash memory. Non-transitory memory may include both persistent memory and RAM. In general, persistent storage 107 may include all forms of memory that maintain data when a computer or other device is powered down. These include, but are not limited to, HDDs, CDs, DVDs, magnetic tapes, solid state drives, portable USB drives and any other suitable form of persistent memory.

The vehicle processor 103 may also include several different inputs allowing the user and external systems to interface with the vehicle processor 103. The vehicle-based computing system 100 may include a microphone 129, an auxiliary input port 125 (for input 133), a Universal Serial Bus (USB) input 123, a Global Positioning System (GPS) input 124, a screen 104, which may be a touchscreen display, and a BLUETOOTH input 115. The VCS 100 may further include an input selector 151 that is configured to allow a user to swap between various inputs. Input from both the microphone 129 and the auxiliary connector 125 may be converted from analog to digital by an analog-to-digital (A/D) converter 127 before being passed to the vehicle processor 103. Although not shown, numerous of the vehicle components and auxiliary components in communication with the VCS may use a vehicle network (such as, but not limited to, a Controller Area Network (CAN) bus, a Local Interconnect Network (LIN) bus, a Media Oriented System Transport (MOST) bus, an Ethernet bus, or a FlexRay bus) to pass data to and from the VCS 100 (or components thereof).

Outputs from the vehicle processor 103 may include, but are not limited to, a visual display 104 and a speaker 113 or stereo system output. The speaker 113 may be connected to an amplifier 111 and receive its signal from the vehicle processor 103 through a digital-to-analog (D/A) converter 109. Outputs can also be made to a remote BLUETOOTH device such as a Personal Navigation Device (PND) 154 or a USB device such as vehicle navigation device 160 along the bi-directional data streams shown at 119 and 121 respectively.

In one illustrative embodiment, the system 100 uses the BLUETOOTH transceiver 115 with an antenna 117 to communicate with a user's nomadic device 153 (e.g., cell phone, smart phone, Personal Digital Assistance (PDA), or any other device having wireless remote network connectivity). The nomadic device 153 can then be used to communicate over a tower-network communication path 159 with a network 161 outside the vehicle 131 through, for example, a device-tower communication path 155 with a cellular tower 157. In some embodiments, tower 157 may be a wireless Ethernet or WiFi access point as defined by Institute of Electrical and Electronics Engineers (IEEE) 802.11 family of standards. Exemplary communication between the nomadic device 153 and the BLUETOOTH transceiver 115 is represented by Bluetooth signal path 114.

Pairing the nomadic device 153 and the BLUETOOTH transceiver 115 can be instructed through a button 152 or similar input. Accordingly, the CPU is instructed that the onboard BLUETOOTH transceiver 115 will be paired with a BLUETOOTH transceiver in a nomadic device 153.

Data may be communicated between the vehicle processor 103 and the network 161 utilizing, for example, a data-plan, data over voice, or Dual Tone Multi Frequency (DTMF) tones associated with nomadic device 153. Alternatively, it may be desirable to include an onboard modem 163 having antenna 118 in order to establish a vehicle-device communication path 116 for communicating data between the vehicle processor 103 and the network 161 over the voice band. The nomadic device 153 can then be used to communicate over the tower-network communication path 159 with a network 161 outside the vehicle 131 through, for example, device-tower communication path 155 with a cellular tower 157. In some embodiments, the modem 163 may establish a vehicle-tower communication path 120 directly with the tower 157 for communicating with network 161. As a non-limiting example, modem 163 may be a USB cellular modem and vehicle-tower communication path 120 may be cellular communication.

In one illustrative embodiment, the vehicle processor 103 is provided with an operating system including an application programming interface (API) to communicate with modem application software. The modem application software may access an embedded module or firmware on the BLUETOOTH transceiver 115 to complete wireless communication with a remote BLUETOOTH transceiver (such as that found in a nomadic device 153). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Other wireless communication means that can be used in this realm is free-space optical communication (such as IrDA) and non-standardized consumer IR protocols or inductive coupled means including but not limited to near-field communications systems such as RFID.

In another embodiment, nomadic device 153 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Division Multiple Access (CDMA), Time Division Multiple Access (TDMA), Space-Division Multiple Access (SDMA) for digital cellular communication, including but not limited to Orthogonal Frequency-Division Multiple Access (OFDMA) which may include time-domain statistical multiplexing. These are all International Telegraph Union (ITU) International Mobile Telecommunication (IMT) 2000 (3G) compliant standards and offer data rates up to 2 Mbps for stationary or walking users and 385 Kbps for users in a moving vehicle. 3G standards are now being replaced by IMT-Advanced (4G) which offers 100 Mbps for users in a vehicle and 1 Gbps for stationary users. If the user has a data-plan associated with the nomadic device 153, it is possible that the data-plan allows for broad-band transmission and the system could use a much wider bandwidth (speeding up data transfer). In still another embodiment, nomadic device 153 is replaced with a cellular communication device (not shown) that is installed to vehicle 131. In yet another embodiment, the nomadic device 153 may be a wireless local area network (LAN) device capable of communication over, for example (and without limitation), an IEEE 802.11g network (i.e., WiFi) or a WiMax network.

In one embodiment, incoming data can be passed through the nomadic device 153 via a data-over-voice or data-plan, through the onboard BLUETOOTH transceiver 115 and to the vehicle's internal processor 103. In the case of certain temporary data, for example, the data can be stored on the HDD or other storage media 107 until the data is no longer needed.

Additional sources that may interface with the vehicle 131 include a personal navigation device 154, having, for example, a USB connection 156 and/or an antenna 158, a vehicle navigation device 160 having a USB 162 or other connection, an onboard GPS device 124, or remote navigation system (not shown) having connectivity to network 161. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the vehicle processor 103 may be in communication with a variety of other auxiliary devices 165. The auxiliary devices 165 can be connected through a wireless (e.g., via auxiliary device antenna 167) or wired (e.g., auxiliary device USB 169) connection. Auxiliary devices 165 may include, but are not limited to, personal media players, wireless health devices, portable computers, and the like.

The vehicle processor 103 may be connected to one or more Near Field Communication (NFC) transceivers 176. The NFC transceivers 176 may be configured to establish communication with compatible devices that are in proximity to the NFC transceivers 176. The NFC communication protocol may be useful for identifying compatible nomadic devices that are proximate the NFC transceivers 176.

Also, or alternatively, the vehicle processor 103 may be connected to a vehicle-based wireless router 173, using for example a WiFi (IEEE 802.11) transceiver/antenna 171. This may allow the vehicle processor 103 to connect to remote networks in range of the local router 173. In some configurations, the router 173 and the modem 163 may be combined as an integrated unit. However, features to be described herein may be applicable to configurations in which the modules are separate or integrated.

The vehicle processor 103 may interface to a vehicle-to-vehicle (V2V) communication system 180. The V2V communication system 180 may be a Dedicated Short-Range Communication (DSRC) system configured to transmit and receive messages directly between vehicles and infrastructure devices when within a predetermined range of one another. The V2V communication system 180 may implement established communication protocols. The V2V communication system 108 may include a transceiver that is configured to transmit and receive messages over the specified communication link. (e.g., DSRC). The V2V communication system 180 may include an antenna. Although the communication system is referred to as vehicle-to-vehicle, the communication system is also capable of vehicle-to-infrastructure (V2I), vehicle-to-pedestrian (V2P), vehicle-to-device (V2D), and vehicle-to-grid (V2G) communications.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

A V2V interface may implement hardware and software for a communication system with other vehicles and infrastructure devices. For example, the V2V communication system 180 and vehicle processor 103 may be configured to implement a system compatible with the Institute of Electrical and Electronics Engineers (IEEE) standard referred to as IEEE 802.11p which is also known a Wireless Access in Vehicular Environments (WAVE). The IEEE 802.11p standard may define the low-level hardware and protocol details of the V2V interface 180. Higher levels of the communication protocol may be defined by other standards. For example, message formats may be according to Society of Automotive Engineers (SAE) standard SAE J2735. The SAE J2735 standard may define the message structure for the various messages communicated by the V2V interface.

The vehicle processor 103 may be configured to broadcast a Basic Safety Message (BSM) at periodic intervals via the V2V communication system 180. The BSM may include mandatory and optional data. Mandatory data in the BSM may be referred to a Part 1 data. For example, the Part 1 data may include vehicle operating conditions such as position, speed, heading, and acceleration. Optional data in the BSM may be referred to as Part 2 data. The Part 2 data may include a variety of additional data elements.

Data sent in the BSM may include a variety of signals that may be indicative of a driving style of the operator. The BSM may include location data (e.g., from GPS sensor), vehicle speed and acceleration. The BSM may also indicate events such as hard braking, antilock brake activation, and/or stability system activation. While the data is useful for communicating with other vehicles to provide situational awareness, the data may also be useful to other entities. The BSMs may not be encrypted to encourage use over a broadcast network. As a result, any individual with a compatible receiver (e.g., DSRC receiver) may read the data with requiring any encryption keys.

The National Highway Traffic Safety Administration (NHTSA) has provided some guidelines for discouraging the recording of the BSM data. The guidelines provide that an entity cannot store the BSM data for more than a specified processing time. The guidelines also provide the any BSM should not contain any data that could link the message back to a specific user or entity at any time (e.g., Vehicle Identification Number (VIN), driver identification).

The contents of the BSM message may include a certificate, the message content, a digital signature, and a timestamp. The certificate may include information regarding a public key and a signature from a certificate authority. The certificate may be used by the receiver to validate the message. The digital signature may include a data string that is generated from the message content and the private key. For example, the message content may be passed through a hash function and then to a signature function that also inputs the private key. The output of the signature function may be a string of data or values referred to as the signature. The signature may be included in the message to be used for validating the message by the receiver. Each message that is broadcast may be similarly processed.

The receiver of the message may verify the message by checking the signature and message contents. For example, the message content may be passed through the hash function and input along with the digital signature and the public key derived from the certificate to a verification function. The output of the verification function may indicate that the message is from a valid sender. Each message that is received may be similarly processed.

The digital signature helps to ensure the integrity of the communications. Participants in the messaging process can ensure that the messages are sent by properly authorized senders. Another aspect of the vehicle-to-vehicle communication system is that a receiver should not be able to associate a particular vehicle with the message data. This is to ensure privacy of the vehicle and vehicle operator. Under the scheme previously described, it could be possible to associate a vehicle with particular message data. If the certificate is not changed, a receiver could monitor the certificate and eventually associate it with a particular vehicle.

Each vehicle may be assigned 20 certificates that are valid for a predetermined time period (e.g., 2 weeks). Each transmitter may change the certificate that it uses at a predetermined time interval (e.g., 5 minutes). In this manner, it becomes more difficult for a receiver to monitor a specific certificate and associate it with a particular vehicle. The vehicle may obtain another set of 20 certificates after the predetermined time period expires. Cycling through more than one certificate makes it difficult to identify and track a particular vehicle over an extended period of time.

In spite of the guidelines, it may still be possible to identify a specific vehicle from the BSM data. Enough information about driving behavior may be collected if the BSMs from a vehicle can be collected and tracked. If an attacker manages to know the specific vehicle from which the BSMs are received, the attacker may be able to identify the driver and ascertain their location and their driving behavior. The attacker could sell this information to various entities. For example, insurance companies may be interested in purchase driving behavior data to set insurance rates.

One method of attack may be source identification based on received signal strength. A transceiver may provide a signal referred to as a Received Signal Strength Indication (RSSI). The RSSI may provide a value indicative of the power of a received radio signal. An attacker may attach a compatible V2V receiver near the target (e.g., near the V2V antenna of the target vehicle). For example, a DSRC receiver could be placed near the vehicle antenna. The DSRC receiver may be configured to record any messages transmitted by the vehicle-to-vehicle communication system. During operation, the DSRC receiver may receive messages from other transmitters as well (e.g., nearby vehicles or structures). The target vehicle messages may be isolated by analyzing the signal strengths of the received signals. As the DSRC receiver is intentionally placed near the target transmitter, the signal strength from the target transmitter is expected to be highest. By collecting the BSMs associated with received signals having the highest RSSI, the attacker may isolate the target vehicle certificates in the BSMs. Over a period of time, this may allow the attacker to record all of the certificates used by the target vehicle. The attacker may record the data in the DSRC receiver or may communicate the data to a central server. The target vehicle, unaware of the situation, may continue to use the same certificates. Once the attacker has the certificates associated with the target vehicle, the attacker may use this information to track the target vehicle.

For example, the attacker may have a network of DSRC receivers installed in an area or region. The receivers may receive all BSMs that are transmitted. The BSM data may be processed to determine if any of the certificates match those of the target vehicle. If a match is found, the attacker may correlate the target vehicle with the location. In addition, any additional Part 2 data that was present in the transmitted data can be recorded and associated with the target vehicle. In this manner, data may be collected and associated with the target vehicle. This data could then be sold to third parties.

The method of attack may rely on the target vehicle having the highest RSSI of all received messages. This is a reasonable assumption provided that all vehicles are configured to transmit at the same power level. If vehicles are transmitting at the same power level, the antenna nearest the attacker's device will likely have the highest RSSI. To prevent such attacks, the DSRC transmitter for each vehicle may be configured to vary the transmit power of the broadcast messages. A typical system may broadcast messages with a constant transmit power. By varying the transmit power, the attacker may find it difficult to identify messages broadcast by the target vehicle. Varying the transmit power may also limit the attacker from identifying all of a vehicle's certificates. This may make later tracking more difficult and incomplete. As such, the incomplete identification may make the information less valuable.

To prevent such attacks, the vehicle-to-vehicle communication system may be configured to vary the transmit power in a way that, at a fixed location relative to an antenna coupled to the transceiver, a receiver cannot associate a certificate within the BSM with the vehicle based on a receive signal strength being greater than those received from messages not sent by the vehicle. The transmit power may be varied so that receiver placed on the vehicle cannot reliably identify the vehicle according to received signal strength.

Figure 2:
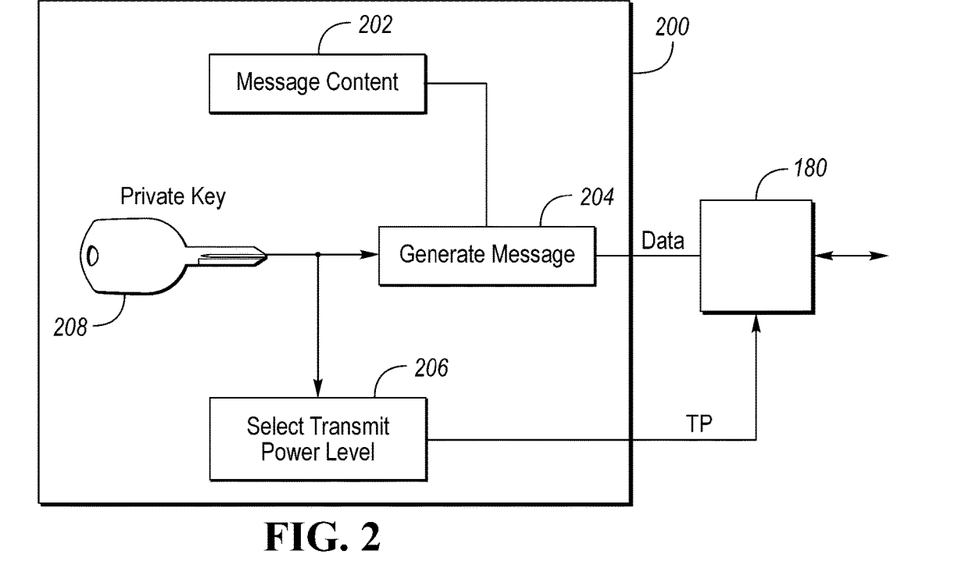
FIG. 2 is as block diagram for generating a message for a vehicle-to-vehicle communication system.

FIG. 2 depicts a block diagram for a possible system for generating messages in a vehicle-to-vehicle communication system. A vehicle controller 200 may be programmed to implement instructions for generating messages. The vehicle controller 200 may implement a message content function 202. The message content function 202 may be configured to identify the data for transmitting in the BSM. For example, the message content function 202 may interface with other functions to retrieve vehicle speed, position, and other signals that are part of the BSM. The vehicle controller 200 may be configured to generate and store a private key 208 as part of a Public Key Infrastructure (PKI) scheme for authenticating messages. The vehicle controller 200 may be further configured to generate and store a public key corresponding to the private key. The public and private keys may be alpha-numeric strings of predetermined lengths.

The vehicle controller 200 may include a generate message function 204. The generate message function 204 may be configured to construct the message for transmission. The generate message function 204 may input the message content as output from the message content function 202. The generate message function 204 may also input the private key 208. The message may be constructed using the message content from the message content function 202. The generate message function 204 may process the message content through a transformation function (e.g., hash function). The generate message function 204 may implement a signature function to which the transformed message content and the private key 208 are input. The signature function may output a digital signature that is included as part of the message. The generate message function 204 may construct a message that includes the message content, the digital signature, and a certificate with information regarding the public key. The message may be transferred to the V2V transceiver 180 for broadcast.

The vehicle controller 200 may include a transmit power selection function 206. The transmit power selection function 206 may be configured to vary the transmit power of the V2V transceiver 180. The private key 208 may be input to the transmit power selection function 206. The transmit power may be selected based on the private key 208. The transmit power level may be varied for each broadcast message according to a predetermined sequence or pattern that changes responsive to changes to the private key 208. The predetermined sequence may be configured to vary the transmit power level for each broadcast message such that, at a fixed location on the vehicle, a receiver cannot associate a certificate within the BSM with the vehicle based on a receive signal strength being greater than the receive signal strength of messages received from other vehicles. The predetermined sequence may change responsive to changes in the private key 208. Further, since each vehicle is assigned a different private key, the predetermined sequence for each vehicle may have a high probability of being different. A control signal may be provided to the V2V transceiver 180 to set the transmit power level.

The predetermined sequence may have several characteristics. The predetermined sequence should be designed so that it is infeasible to reproduce the private key based on the predetermined sequence. The predetermined sequence may be updated at regular intervals with an algorithm defined by the manufacturer. For example, the predetermined sequence may be changed via a cellular communication link at predetermined intervals. In some configurations, the predetermined sequence may be updated at the same frequency as the 20 certificates.

Figure 3:
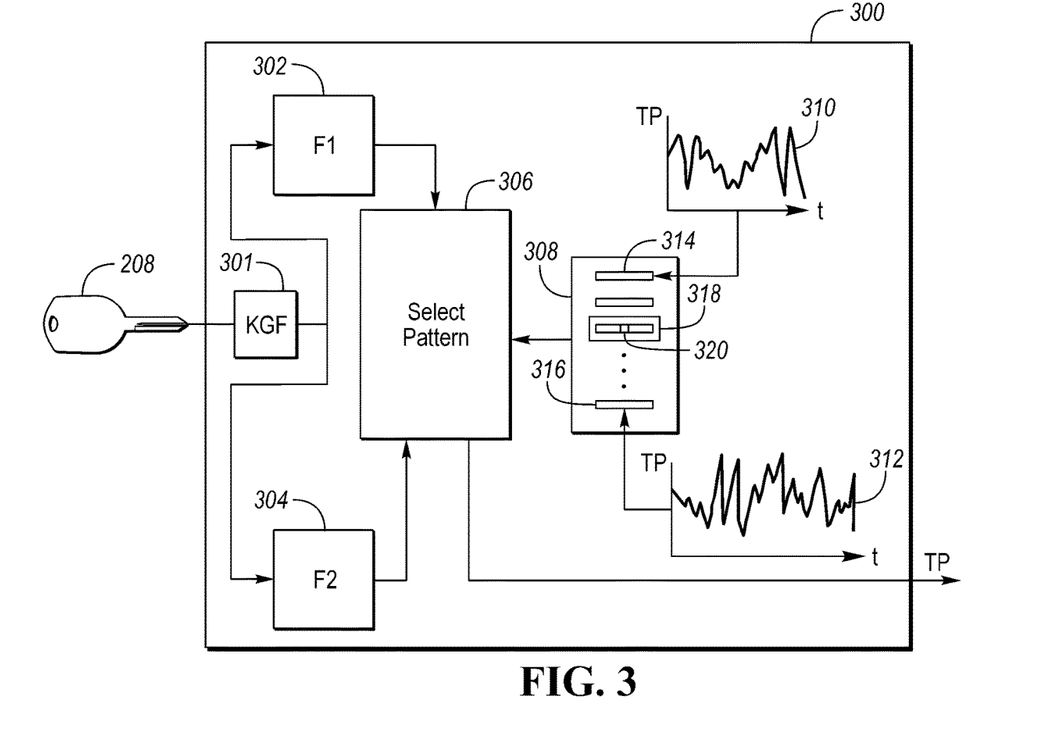
FIG. 3 is a block diagram for adjusting the transmit power level for broadcasting messages.

FIG. 3 depicts a block diagram for a possible transmit power selection function 300. The vehicle controller 200 may be configured to store a predefined number of predetermined patterns or sequences 308 representing transmit power levels. The predetermined sequences 308 may include N sequences. For example, a first sequence 310 may be stored in a first array 314. An Nth sequence 312 may be stored in an Nth array 316. Each of the arrays may contain M elements to define the sequence. A specific sequence may be selected by selecting the sequence (elements 1 through N) and the specific element (elements 1 through M) of the sequence.

The transmit power selection function 300 implemented in the vehicle controller 200 may include a pattern selection function 306. The pattern selection function 306 may be configured to select one of the predetermined sequences 308 for setting the transmit power levels for each broadcast message. The pattern selection function 306 may maintain indices for selecting one of the elements from one of the predetermined sequences 308.

The transmit power selection function 300 may include a Key Generation Function 301 that is configured to input the private key 208 and output a derived key. The derived key may be one or more values that are derived or generated from the private key 208. The Key Generation Function 301 allows the derived key to be used within the vehicle controller 200. Since each vehicle has a different private key for communication, it is expected that different derived keys will result for each vehicle. The Key Generation Function 301 may be executed during an initialization period to generate one or more derived keys. The derived keys may be stored in non-volatile memory. Responsive to the private key 208 changing, the Key Generation Function 301 may be executed to generate new derived keys. In some configurations, the Key Generation Function 301 may be reprogrammable such that the derived keys may be updated at predetermined intervals. For example, an updated function may be periodically uploaded to the vehicle so that the derived key may be regenerated.

The transmit power selection function 300 implemented in the vehicle controller 200 may include a first selection function 302 that is configured to input the derived key that is output from the Key Generation Function 301 and output a selection for one of the predetermined sequences 308. A second selection function 304 may be configured to input the input the derived key that is output from the Key Generation Function 301 and output a selection for a specific element of the selected sequence. Various methods may be used to process the derived key and arrive at an output value. In some configurations, the bytes that make up the derived key may be summed to arrive at an output value. The summation result may then be scaled to generate a number within the desired selection range. For example, the summation result may be divided by a scaling factor to create a value between 1 and N (or 1 and M). Note that other methods could be used without limitation. Since each vehicle has a different private key for communication, it is expected that different indices will result for each vehicle. As a result, there is a high probability that nearby vehicles are not transmitting with the same transmit power level even if the same predetermined sequences 308 are defined in each vehicle.

The pattern selection function 306 may receive the output of the first selection function 302. The output of the first selection function 302 may select which of the predetermined sequences 308 is to be used. The first selection function 302 may be configured to generate an index corresponding to one of a plurality of predetermined transmit power sequences 308 as a function of the derived key. For example, a value output from the first selection function 302 may provide a number from 1 to N (the number of predetermined patterns). The value may represent a selected sequence 318. The pattern selection function 306 may receive the output of the second selection function 304. The second selection function 304 may generate a starting index into the selected sequence 318 as a function of the derived key. The output of the second selection function 304 may define which element of the selected sequence 318 is the first to be output. The pattern selection function 306 may maintain an index (e.g., with values 1-M) for a selected element 320 from the selected sequence 318. The pattern selection function 306 may increment the index or selected element 320 after each message broadcast to select the next element for the next broadcast. The pattern selection function 306 may reset the index to the first element when the increment causes the value to increase above M. The pattern selection function 306 may output the value at the selected element 320 of the selected sequence 318 to the transceiver.

In some configurations, there may be a single sequence with a predetermined number of elements representing transmit power levels. The single sequence may be generated using the derived key. Operations may be implemented on a remote server to generate the predetermined sequence based on a manufacturer defined algorithm. The single sequence may then be transferred to non-volatile memory of the vehicle controller 200. In such configurations, the first selection function 302 and the second selection function 304 may be modified. For example, only the second selection function 304 may be executed to select the starting index. The private key 208 may be monitored to determine if there are changes that require the derived key to be updated. In other configurations, the remote server may generate the predetermined sequence 308 for transfer to the vehicle controller 200 according to a manufacturer defined algorithm.

Each time a message is broadcast, the transmit power level may be adjusted by the presently selected element of the predetermined sequence. The predetermined sequences 308 may be stored as values that are to be output to the V2V transceiver 180. The transmit power levels of the predetermined sequences 308 may be configured to have a at least a minimum difference between consecutive elements so that no two consecutive power levels fall too close to one another. A magnitude of a difference between consecutive elements of the predetermined sequences 308 may be defined to be greater than a predetermined minimum value. For example, the magnitude of the difference between consecutive elements may be defined to be at least five percent of the maximum power value. In some configurations, the magnitude of the difference between consecutive elements could be defined by a fixed value (e.g., 2 dBm, 4 dBm).

In some configurations, the predetermined sequences 308 may define a change in the transmit power level from a previous transmit level. In such a configuration, the pattern selection function 306 may be configured to generate a starting transmit power level which may be a value derived as a function of the derived key. The change values may then be added to the previous transmit power level value. The transmit power level may be limited to be within a predetermined range of values defined by a minimum power level and a maximum power level. The power levels defined in the predetermined sequences 308 may be such that the power level does not fall below the minimum power level. The power levels defined in the predetermined sequences 308 may be such that the power level does not exceed the maximum power level (e.g., 33 dBm).

The advantage of storing the predetermined sequences 308 is that the lookup of transmit power values may be more efficient with respect to processor execution time. For example, the lookup scheme described is more efficient than having to execute a random number generator at each broadcast interval. In addition, the varying values defined by the predetermined sequences can ensure a receive strength-based attack is not successful. The predetermined sequences may remain the same between power cycles when there are no changes to the derived key or the private key.

To prevent receive strength based attacks, the DSRC transmitter of the vehicle may be configured to vary the transmit power levels at periodic intervals. The transmit power may be varied at the transmission rate of the BSM data (e.g., 1 second intervals). In this manner, the attacker may not be able to distinguish BSM data from the target vehicle. At a given time, other nearby vehicles or infrastructure devices may be broadcasting signals that are received by the attacker with a larger signal strength than those signals from the target vehicle. The attacker may be unable to effectively distinguish the target vehicle from other sources. Thus, data collected by the attacker and sorted by signal strength is likely to include data from many different sources. As the data is not specific to a given target vehicle, the data is less valuable. Further, as many different sources may be represented, later tracking may be ineffective and yield confusing results. For example, by storing certificates associated with different vehicles, later tracking could show the target vehicle in multiple locations at the same time. Thus, any tracking done using this data is ineffective.

Figure 4:
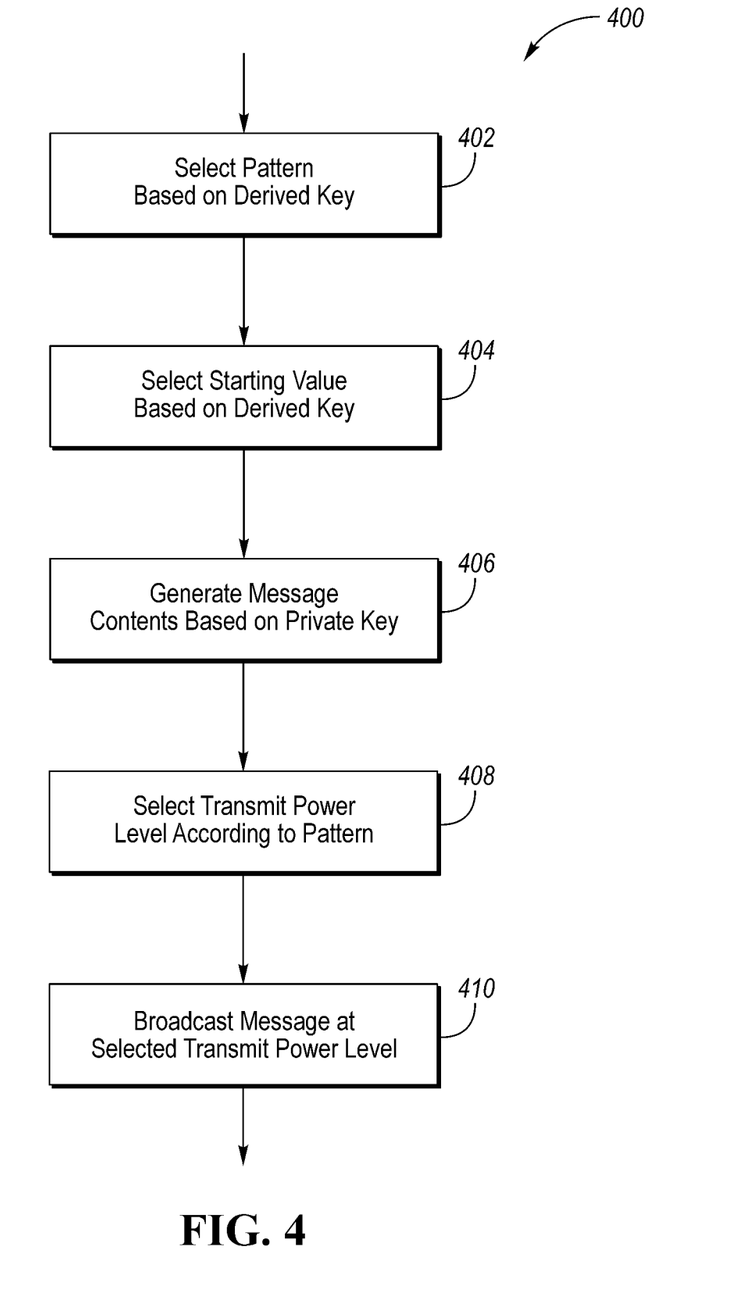
FIG. 4 is a possible flow chart for a sequence of operations for adjusting the transmit power level for broadcast messages.

FIG. 4 depicts a flow chart 400 for a possible sequence of operations for a controller. At operation 402, the controller may be programmed to select a predetermined pattern or sequence based on the key derived from the private key 208 as described above. The operation may be performed once at controller power-up. At operation 404, the controller may be programmed to select a starting value based on the derived key. The starting value may be an initial transmit power level or may be a starting index to the predetermined sequence. The operation may be performed once at power-up. Note that in some configurations, operation 404 may be not be necessary.

At operation 406, the controller may be programmed to generate the message contents based on the private key as described above. For example, the private key may be used to generate a digital signature that is included in the message. At operation 408, the controller may be programmed to select and output the transmit power level according to the selected pattern or sequence. An index into the predetermined sequence may be managed and maintained. For example, the index may be incremented after each broadcast message to point to the next transmit power level. At operation 410, the controller may be programmed to broadcast the message at the selected transmit power level. Operations 406, 408, and 410 may be repeated for each BSM that is broadcast.

The systems and methods described can improve privacy of data transmitted over the vehicle-to-vehicle communication system. The system can make it more difficult to identify a specific vehicle with a received strength based attack. The resulting system may reduce the effectiveness of such attacks.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a transceiver for vehicle-to-vehicle communication; and
   a controller programmed to,
      generate a power level sequence using a private key associated with the vehicle, wherein the power level sequence has a plurality of power level elements,
      select a power level element from the power level sequence using the private key,
      digitally sign each of a plurality of basic safety messages (BSMs) using the private key and
      broadcast each of the BSMs via the transceiver at respective transmit power levels according to the power level element.

2. The vehicle of claim 1 wherein the power level sequence defines the respective transmit power level for each of the BSMs such that a magnitude of a difference in transmit power levels between consecutive broadcasts is at least a predetermined magnitude.

3. The vehicle of claim 1 wherein the power level sequence defines a change in transmit power level from a previous transmit power level.

4. The vehicle of claim 3 wherein a magnitude of the change is at least a predetermined minimum change for each broadcast.

5. The vehicle of claim 3 wherein the controller is further programmed to generate a starting transmit power level based on the one or more values generated from the private key.

6. The vehicle of claim 1 wherein the respective transmit power levels are within a predetermined range.

7. The vehicle of claim 1 wherein the power level sequence defines transmit power levels such that a receiver attached at a fixed location on the vehicle cannot associate a certificate within the basic safety messages with the vehicle based on a receive signal strength being greater than those received from messages not sent by the vehicle.

8. A vehicle system comprising:
   a transceiver; and
   a controller programmed to
      generate a power level sequence using a private key associated with the vehicle, wherein the power level sequence has a plurality of power level elements,
      select a power level element from the power level sequence using the private key,
      digitally sign each of a plurality of basic safety messages (BSMs) using the private key, and
      broadcast each of the BSMs via the transceiver at respective transmit power levels according to the power level element.

9. The vehicle system of claim 8 wherein the controller is further programmed to generate a starting power level based on one or more values generated from the private key.

10. The vehicle system of claim 8 wherein the power level sequence defines a change in transmit power level from a previous transmit power level.

11. The vehicle system of claim 10 wherein the controller is further programmed to generate an initial transmit power level as a function of one or more values generated from the private key.

12. The vehicle system of claim 8 wherein the power level sequence defines transmit power levels such that a receiver attached at a fixed location on a vehicle associated with the vehicle system cannot associate a certificate within the basic safety messages with the vehicle based on a receive signal strength being greater than those received from messages not sent by the vehicle.

13. A method for a vehicle comprising:
   generating, via a controller, a power level sequence using a private key associated with the vehicle, wherein the power level sequence has a plurality of power level elements,
   selecting, via the controller, a power level element from the power level sequence using the private key, and
   digitally signing, via the controller, each of a plurality of basic safety messages (BSMs) using the private key, and
   broadcasting, via a wireless transceiver, each of the BSMs at respective transmit power levels according to the power level element.

14. The method of claim 13 further comprising changing, by the vehicle controller, the power level sequence in response to changes in one or more values generated from the private key.

15. The method of claim 13 wherein the power level sequence defines the respective transmit power levels such that a magnitude of a difference in transmit power levels between consecutive broadcasts is at least a predetermined magnitude.

\* \* \* \* \*